(12) United States Patent
Birsching et al.

(10) Patent No.: US 8,589,031 B2
(45) Date of Patent: Nov. 19, 2013

(54) ELECTRIC POWER STEERING CONTROL METHODS AND SYSTEMS USING HYSTERESIS COMPENSATION

(75) Inventors: Joel E. Birsching, Vassar, MI (US);
Ashok Chandy, Fenton, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 13/397,363

(22) Filed: Feb. 15, 2012

(65) Prior Publication Data

US 2012/0209475 A1      Aug. 16, 2012

Related U.S. Application Data

(60) Provisional application No. 61/443,504, filed on Feb. 16, 2011, provisional application No. 61/443,564, filed on Feb. 16, 2011.

(51) Int. Cl.
*B62D 6/00*      (2006.01)

(52) U.S. Cl.
USPC ........................................................ 701/42

(58) Field of Classification Search
USPC .................................... 701/41–42
See application file for complete search history.

(56) References Cited

U.S. PATENT DOCUMENTS

| | | | | |
|---|---|---|---|---|
| 5,182,711 | A * | 1/1993 | Takahashi et al. | 701/41 |
| 5,978,721 | A * | 11/1999 | Kagawa et al. | 701/41 |
| 6,131,693 | A | 10/2000 | Mukai et al. | |
| 6,408,234 | B1 * | 6/2002 | Wittig | 701/41 |
| 6,827,177 | B2 * | 12/2004 | Asada et al. | 180/466 |
| 6,898,966 | B2 * | 5/2005 | Ono et al. | 73/146 |
| 2004/0133330 | A1 * | 7/2004 | Ono et al. | 701/80 |
| 2009/0157258 | A1 * | 6/2009 | Hales et al. | 701/41 |

OTHER PUBLICATIONS

European Search Report, EP 12155601.3-1755/2489577, Dated: Jun. 20, 2013, 11 pages.

* cited by examiner

*Primary Examiner* — Mary Cheung
*Assistant Examiner* — Anne Mazzara
(74) *Attorney, Agent, or Firm* — Cantor Colburn LLP

(57) ABSTRACT

A control system for a steering system is provided. The control system includes a direction determination module, a position determination module, and a final command module. The direction determination module determines a change in a handwheel torque. The position determination module determines a position on a hysteresis loop. The position on the hysteresis loop depends on the change in the handwheel torque. The final command module determines a final assist value based on the position. The final command module generates an assist command.

19 Claims, 15 Drawing Sheets

ELECTRIC POWER STEERING CONTROL METHODS AND SYSTEMS USING HYSTERESIS COMPENSATION

CROSS-REFERENCES TO RELATED APPLICATIONS

This patent application claims priority to U.S. Provisional Patent Application Ser. No. 61/443,564 and U.S. Provisional Patent Application Ser. No. 61/443,504, both filed on Feb. 16, 2011, both of which are incorporated herein by reference in their entirety.

BACKGROUND OF THE INVENTION

The present invention relates to methods and systems for controlling a steering system, and more particularly to methods and system for controlling a steering system using hysteresis compensation.

In electric power steering systems, the amount of assist provided is determined based on the driver torque. Due to friction of the system, the actual assist generated can be less when the driver input is steering into a corner (increasing effort) than when the driver input is returning from a corner (decreasing effort). This provides an undesirable torque feedback to the driver when the direction is reversed.

Accordingly, it is desirable to provide for control systems and methods that compensate for the undesirable effects of friction.

SUMMARY OF THE INVENTION

A control system for a steering system is provided. The control system includes a direction determination module, a position determination module, and a final command module. The direction determination module determines a change in a handwheel torque. The position determination module determines a position on a hysteresis loop. The position on the hysteresis loop depends on the change in the handwheel torque. The final command module determines a final assist value based on the position. The final command module generates an assist command.

In another embodiment, a control system for a steering system is provided. The control system includes a torque determination module, a position determination module, and a final command module. The torque determination module receives as input a velocity and a handwheel torque and determines a change in a handwheel torque. One of the velocity, the handwheel torque, or a combination of the velocity and the handwheel torque are used to determine the handwheel torque change. The position determination module determines a position on a hysteresis loop. The position on the hysteresis loop depends on the change in the handwheel torque. The final command module determines a final assist value based on the position. The final command module generates an assist command.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
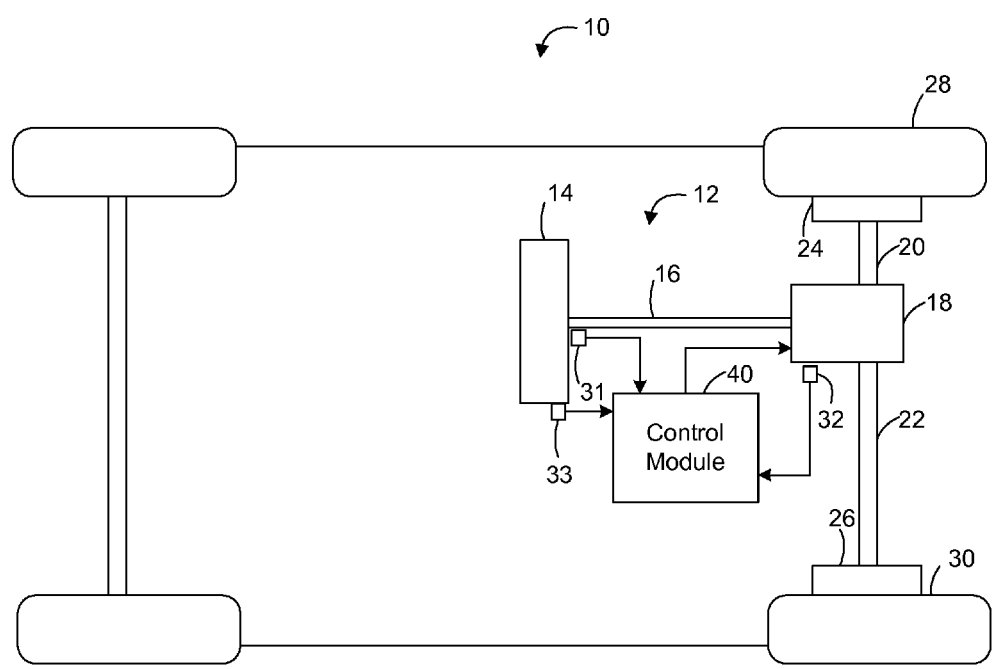
FIG. 1 is a functional block diagram illustrating a vehicle including a steering control system in accordance with exemplary embodiments.

The following description is merely exemplary in nature and is not intended to limit the present disclosure, application, or uses. It should be understood that throughout the drawings, corresponding reference numerals indicate like or corresponding parts and features.

Referring now to FIG. 1, where the invention will be described with reference to specific embodiments without limiting same, an exemplary embodiment of a vehicle 10 including a steering system 12 is illustrated. In various embodiments, the steering system 12 includes a handwheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing. During operation, as the handwheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses the torque applied to the handwheel 14 by the operator of the vehicle 10. The torque sensor generates a driver torque signal based thereon. In another example, the sensor 32 is a motor speed sensor that senses a rotational speed of the motor of the steering assist unit. The sensor 32 generates a motor speed or velocity signal based thereon. In yet another example, the sensor 33 is a handwheel position sensor that senses a position of the handwheel. The sensor 33 generates a handwheel position signal based thereon.

A control module 40 controls the operation of the steering system 12 based on one or more of the sensor signals and further based on the steering control systems and methods of the present disclosure. Generally speaking, the steering control systems and methods of the present disclosure compensate for the undesirable effects of friction, when a direction of the handwheel 14 is reversed. In various embodiments, the systems and methods of the present disclosure provide additional assist when the driver is steering into an increasing load and provide reduced assist when the driver is returning to center, or against a decreasing load. For example, the methods and systems can monitor a change in handwheel torque, and can follow a calibrated hysteresis loop to determine a percent of additional assist or reduction assist that should be applied. The magnitude of the additional assist can be determined based on the nominal assist, driver torque, and vehicle speed.

Figure 2:
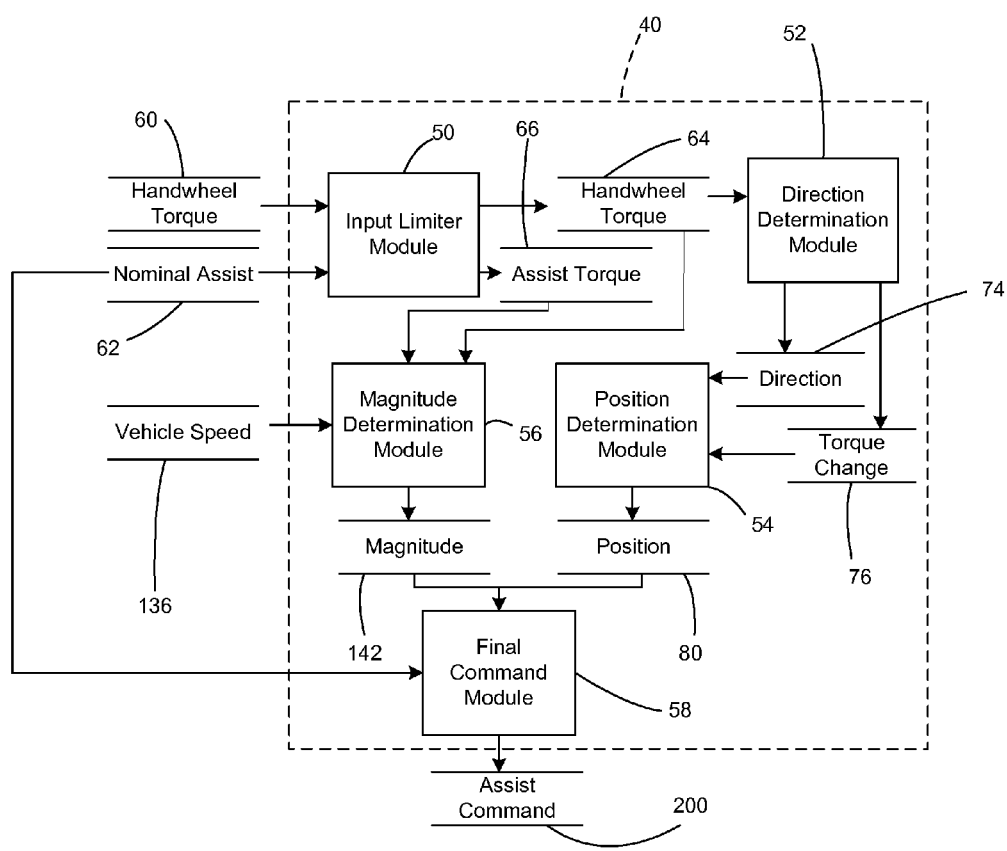
FIG. 2 is a dataflow diagram illustrating a steering control system in accordance with one embodiment of the steering control system shown in FIG. 1.

Referring now to FIG. 2, a dataflow diagram illustrates an exemplary embodiment of the control module 40 of FIG. 1 used to control the steering system 12 of FIG. 1. In various embodiments, the control module 40 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly generate the assist command signal to the steering system 12 (FIG. 1). Inputs to the control module 40 can be generated from the sensors 31, 32, 33 (FIG. 1) of the vehicle 10 (FIG. 1), can be received from other control modules (not shown) within the vehicle 10 (FIG. 1), can be modeled, and/or can be predefined.

In one example, the control module 40 includes an input limiter module 50, a direction determination module 52, a position determination module 54, a magnitude determination module 56, and a final command module 58.

Figure 3:
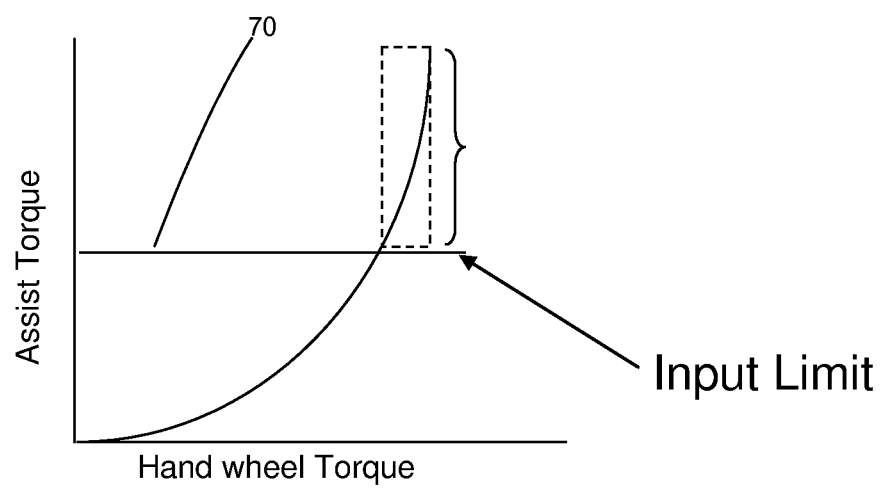
FIG. 3 is a graph illustrating an input limit in accordance with the steering control system.

The input limiter module 50 receives as input a handwheel torque 60 and a nominal assist 62. The input limiter module 50 limits the handwheel torque 60 and the nominal assist 62 based on a predetermined limit and generates a limited handwheel torque 64 and a limited assist torque 66 based thereon. For example, FIG. 3 is an illustration of the handwheel torque 60 on the x-axis versus the nominal assist torque 62 on the y-axis. As shown in FIG. 3, the input limiter module 50 freezes or maintains a certain value of torque and/or nominal assist once the nominal assist 62 reaches a predetermined threshold or input limit 70. In various embodiments, the input limiter module 50 filters the handwheel torque 60 and the nominal assist 62. An exemplary input limiting method is illustrated at 100 of the model of FIG. 6.

Figure 6:
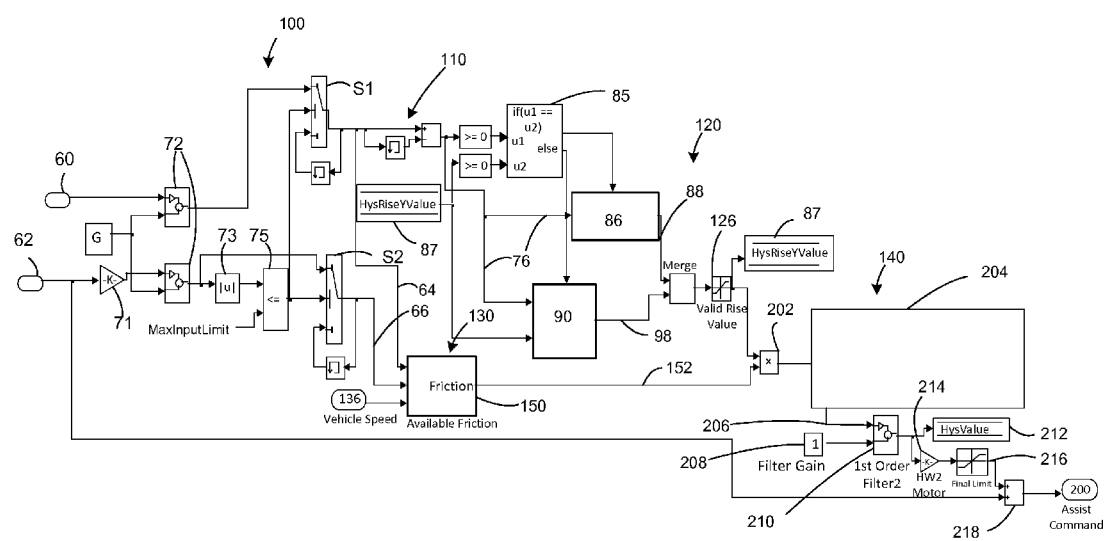
FIGS. 6-11 are models illustrating exemplary steering control methods and systems in accordance with the steering control system.

Referring now to FIG. 6, the handwheel torque 60 and the nominal assist 62 are both inputted into first order low pass filters 72. Although first order low pass filters are illustrated, it is understood that these or any other filter may be used as well. A filter gain G may be applied to both low pass filters 72. For example, in one embodiment, the filter gain is about 0.15. The nominal assist 62 is converted from motor coordinates into hand wheel coordinates by block 71 before being sent to the low pass filter 72. The nominal assist 62 from the low pass filter 72 is sent to a block 73. The magnitude (i.e., the absolute value) of the nominal assist 62 from the low pass filter 72 is calculated at block 73, and is then sent to a block 75, which compares the magnitude from block 72 with a Maximum Input Limit. The Maximum Input Limit is a calibration value. When the nominal assist 62 is above the Maximum Input Limit, the input values (i.e., the handwheel torque 60 and the nominal assist 62) are limited until the nominal assist 62 decreases below the Maximum Input Value. The output from the block 75 is then sent to two switch function blocks S1 and S2. The block 75 evaluates if the filtered value of the nominal assist 62 is less than or equal to the Maximum Input Value, and outputs a TRUE or FALSE value. If the value is TRUE, then each of the switches S1 and S2 output the values connected to the upper input of each switch, which is the filtered values for the handwheel torque 60 and the nominal assist 62. If the value is FALSE, then each of the switches S1 and S2 output the values connected to the bottom input of each switch, which is the previous value for the output of each switch. This approach will hold values for the nominal assist 62 and the handwheel torque 60 at a constant while the nominal assist 62 is above the Maximum Input Value until the nominal assist 62 drops below the Maximum Input Value. The first switch function block S1 outputs the limited handwheel torque 64 (shown in FIG. 2) and the second switch function block S2 outputs the limited assist torque 66 (shown in FIG. 2).

Turning back to FIG. 2, the direction determination module 52 receives as input the limited handwheel torque 64. The direction determination module 52 determines a torque direction 74 and a change in the torque value 76 (e.g., from a previous torque value). For example, the torque direction 74 can be a same direction or a change in direction. An exemplary direction determination method is illustrated at 110 of the model of FIG. 6.

Figure 4:
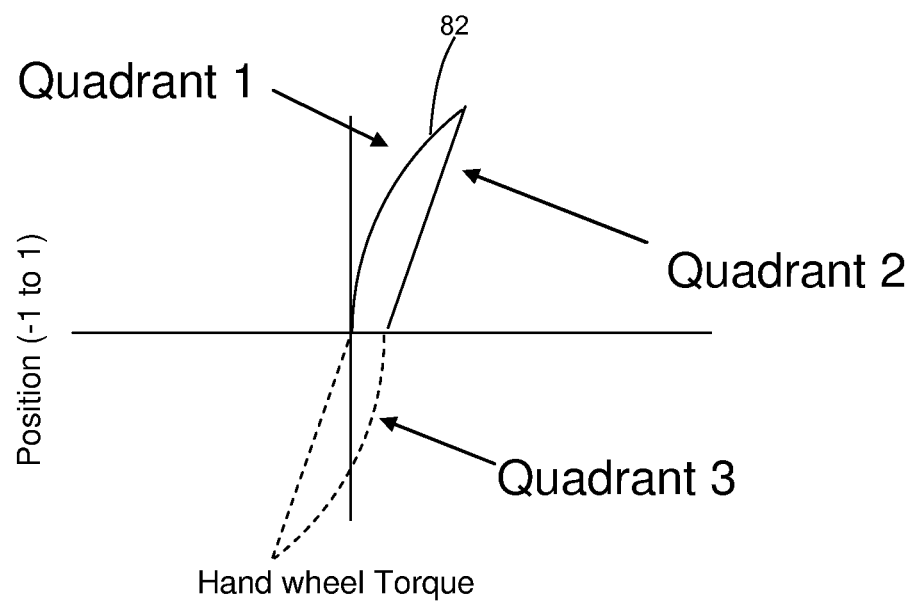
FIG. 4 is a graph illustrating a hysteresis loop in accordance with the steering control system.

The position determination module 54 receives as input the torque direction 74 and the change in the torque value 76 from the direction determination module 52. Based on the torque direction 74 and the change in the torque value 76, the position determination module 54 determines a position 80 (where the position 80 represents, for example, an X,Y coordinate) on a hysteresis loop 82 (shown in FIG. 4). The position 80 on the hysteresis loop 82 depends on the change in the torque value 76. Referring now to FIGS. 2 and 4, the horizontal coordinate axis represents a change in handwheel torque, and the vertical axis represents the hysteresis position. In various embodiments, the position determination module 54 determines the position 80 based on the hysteresis loop 82 as shown in FIG. 4. For example, the X coordinates (e.g., the cumulative change in handwheel torque, which is the previous X value, plus the handwheel torque change) can be based on predetermined values and the Y coordinates (e.g. the hysteresis position) can be between a range (e.g., between −1 and 1). An exemplary position determination method using the hysteresis loop 82 is illustrated at 120 of the model of FIG. 6, and further illustrated by the models in FIGS. 7-10.

Referring to FIG. 6, the position determination method 120 includes an If block 85, a Quadrant 1 block 86 (or a first quadrant block) and a Quadrant 2/3 block 90 (or a combined second and third quadrant block). The If block 85 includes u1 and u2 values, which receive TRUE and FALSE inputs corresponding to a signed value. The u1 value represents a sign of the change in the torque value 76. The u2 value represents a sign of a last hysteresis value 87 for the y-axis. If u1 and u2 are equal (i.e., if the signs of both inputs are equal) then the sign of the last hysteresis value 87 is equal to the sign of the torque value 76, and the Quadrant 1 block 86 is executed. If the signs of u1 and u2 are not equal, (e.g., if the signs of the last hysteresis value 87 and the torque change 76 are not equal) then the Quadrant 2/3 block 90 is executed.

Figure 7:
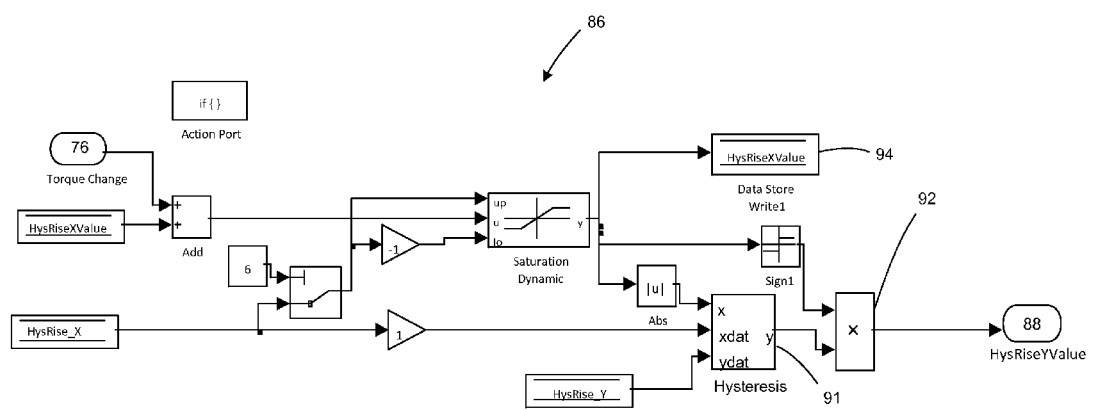

The Quadrant 1 block 86 corresponds to Quadrant 1 (shown in FIG. 4). Turning now to FIG. 7, an exemplary Quadrant 1 block 86 is illustrated. Referring to both FIGS. 6 and 7, the torque change 76 from the direction determination module 52 (FIG. 2) is inputted into the Quadrant 1 block 86.

The Quadrant 1 block 86 computes a hysteresis rise value 88, or hysteresis position, for the y-axis if the handwheel torque direction (shown in the graph illustrated in FIG. 4) remains the same. A lookup table 91 may be used to determine the value of the hysteresis rise value 88. A multiplier 92 is provided to determine the sign of the hysteresis rise value 88. The x axis coordinate 94 corresponding to the hysteresis rise value 88 may be stored in a memory of the control module 40 (shown in FIG. 2) for the next loop.

Figure 8:
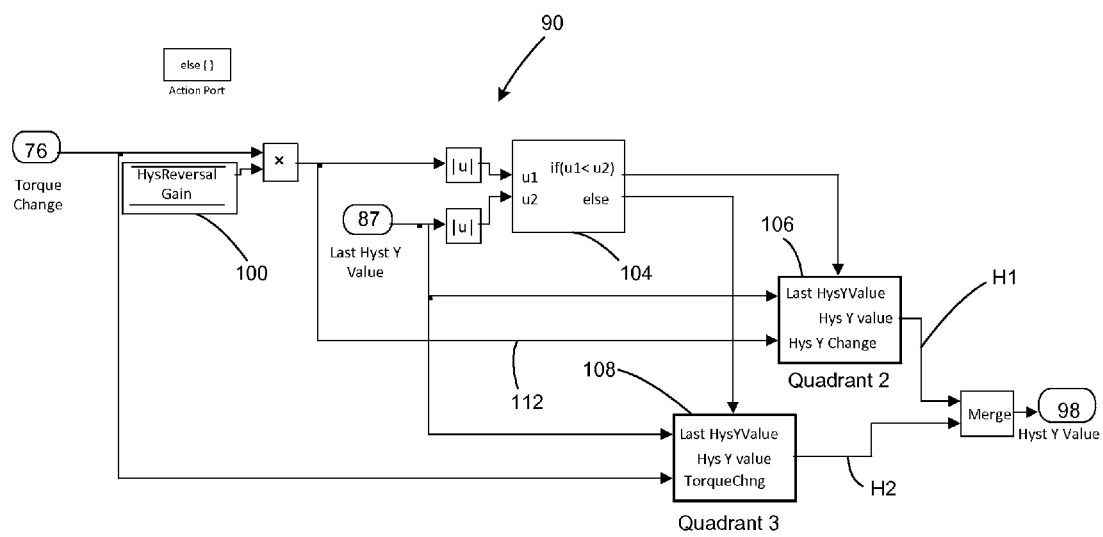

FIG. 8 is an illustration of an exemplary Quadrant 2/3 block 90 is shown. Referring to both FIGS. 6 and 8, the torque change 76 from the direction determination module 52 (FIG. 2) is inputted into the Quadrant 2/3 block 90. The Quadrant 2/3 block 90 computes a hysteresis value 98 for the y-axis if the handwheel torque direction (shown in FIG. 4) is different than the sign of the previous hysteresis position. In the embodiment as shown in FIG. 8, the torque change 76 is multiplied by a hysteresis reversal gain 100 to obtain a hysteresis change value 112 (shown in FIG. 9). The hysteresis change value 112 represents the hysteresis consumed by reversing direction of the handwheel torque 60.

A determination block 104 is provided, to determine how much of the last hysteresis value 87 has been removed. The removal may be a partial or a full reversal. For example, if the amount removed is less than the last hysteresis value 87 then the removal is a partial reversal. Specifically, if the hysteresis change value 112, (which is denoted as u1), is less than the last hysteresis value 87 (which is denoted as u2), then the removal is a partial reversal and is determined by the Quadrant 2 block 106.

Figure 9:
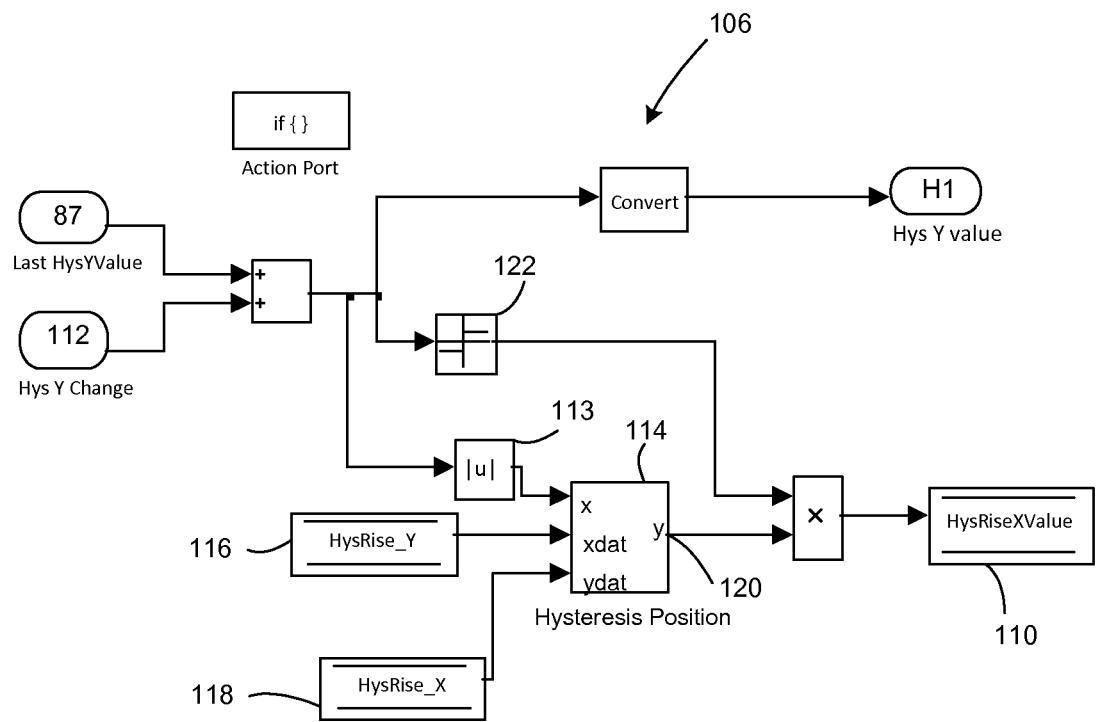

FIG. 9 is a detailed view of one embodiment of the Quadrant 2 block 106. In the embodiment as shown in FIG. 9, a hysteresis rise value H1 is determined by adding the hysteresis change value 112 to the last hysteresis value 87. This in turn will reduce the magnitude of a corresponding x-axis value 110 of the hysteresis rise value H1 and the hysteresis value 87 because the hysteresis change value 112 has a different sign than the last hysteresis value 87. The corresponding x-axis value 110 is found by inputting the magnitude 113 of the hysteresis rise value H1 into a lookup table 114. An x-axis table 116 used for the lookup table 114 corresponds to the y-axis table values used in the lookup table 91 of FIG. 7. A y-axis table 118 used for the lookup table 114 corresponds to the x-axis table values used in the lookup table 91 of FIG. 7. The output of the lookup table 114 determines a y-value 120 that is multiplied by a sign change 122 to determine the corresponding x axis value 110.

Figure 10:
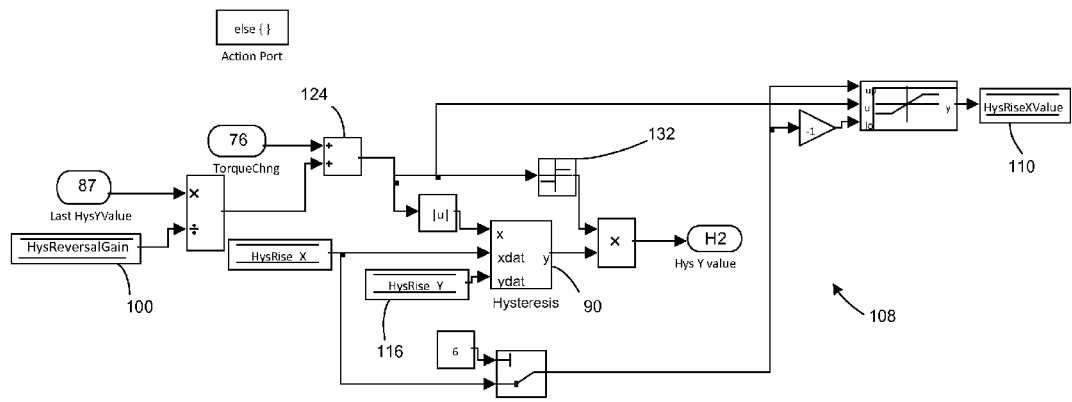

With reference back to FIG. 8, if, however, the amount removed is greater than the last hysteresis value 87 then the removal is a full reversal. Specifically, if the hysteresis change value 112 (which is denoted as u1), is greater than the last hysteresis value 87 (which is denoted as u2), then the removal is a full reversal and is determined by the Quadrant 3 block 108. FIG. 10 is a detailed view of one embodiment of the Quadrant 3 block 108. For example, as shown in FIG. 10, the hysteresis reversal gain 100 and the torque change 76 are inputted into the Quadrant 3 block to determine the amount of torque that is consumed in Quadrant 2 (shown in the graph in FIG. 4). The amount of torque consumed in Quadrant 2 is then subtracted from the torque change 76 in block 124, where the result is a new x-position that is inputted into the lookup table 91 (also used for the Quadrant 1 block 86 shown in FIG. 7) to determine the value of a hysteresis value H2. A multiplier is provided to multiply a signed value 132 to determine the sign of the hysteresis value H2. Turning back to FIG. 8, the hysteresis values H1 and H2 are merged together to create the hysteresis rise value 98. Referring to FIG. 6, the hysteresis rise value 88 and the hysteresis rise value 98 are merged together to create a hysteresis position, and are sent to a limiter 126 to ensure that the merged value is within a range of 1 to −1.

Figure 5A:
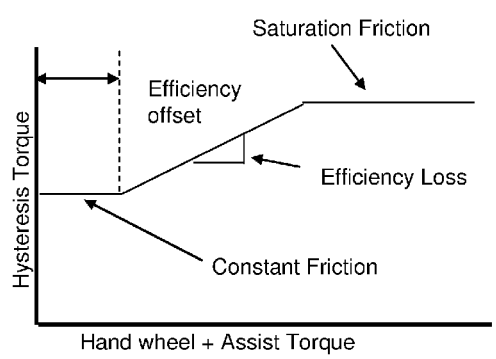
FIGS. 5A and 5B are graphs illustrating values for the magnitude determination in accordance with the steering control system.
Figure 5B:
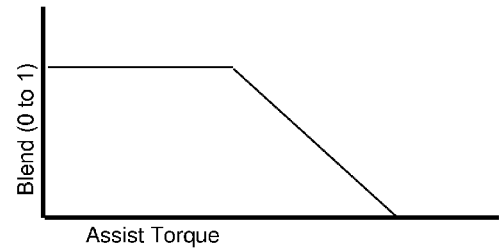

Turning back to FIG. 2, the magnitude determination module 56 receives as input the limited handwheel torque 64, the limited assist torque 66, and a vehicle speed 136. Based on the inputs, the magnitude determination module 56 determines a magnitude 142 of the hysteresis of the steering system 12 (shown in FIG. 1). In various embodiments, the magnitude 142 may be a friction value, which is shown in FIG. 5A, and is blended as shown in FIG. 5B. An exemplary friction determination method is illustrated at 130 of FIG. 6, and further illustrated by the model in FIG. 11. Referring to FIG. 6, a friction determination module 150 may be used to determine a friction value 152 (shown in FIG. 11).

Figure 11:
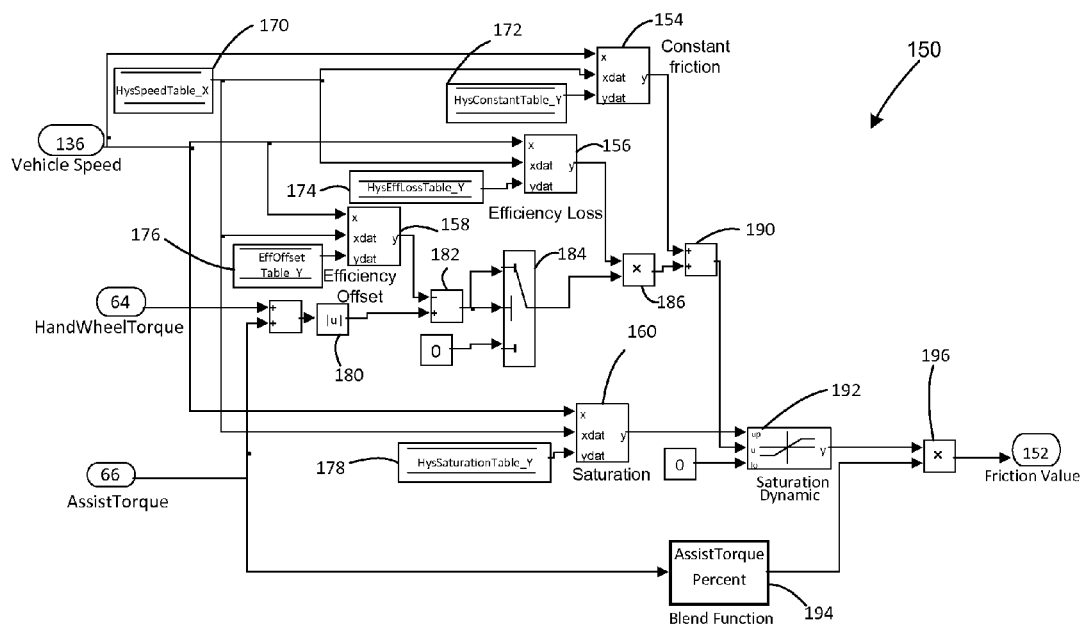

FIG. 11 is an exemplary illustration of one embodiment of the friction determination module 150. The vehicle speed 136, the limited handwheel torque 64, and the limited assist torque 66 are inputs. The friction value 152 is based on a constant friction lookup table 154 (which corresponds to the constant friction as illustrated in the graph of FIG. 5A), an efficiency loss table 156 (which corresponds to the efficiency loss as illustrated in FIG. 5A), an efficiency offset table 158 (which corresponds to the efficiency offset as illustrated in FIG. 5A), and a saturation table 160 (which corresponds to the saturation friction as illustrated in FIG. 5A). The vehicle speed 136 is used as an x-axis value of the constant friction lookup table 154, the efficiency loss table 156, the efficiency offset table 158, and the saturation table 160. A hysteresis speed lookup table 170 is used as an x-axis data value for the constant friction lookup table 154, the efficiency loss table 156, the efficiency offset table 158, and the saturation table 160. A hysteresis constant table 172 is used to provide a y-axis data value for the constant friction lookup table 154. A hysteresis efficiency loss table 174 is used to provide a y-axis data value for the efficiency loss table 156. An efficiency offset table 176 is used to provide a y-axis data value for the efficiency offset table 158. A hysteresis saturation table 178 is used to provide a y-axis value for the saturation table 160.

The limited handwheel torque 64 and the limited assist torque 66 are added together and a magnitude 180 of the sum of the limited handwheel torque 64 and the limited assist torque 66 are sent to a block 182. The efficiency offset table 158 determines a y-value that is sent to block 182. Block 182 subtracts the y-value of the efficiency offset table 158 from the magnitude 180. A switch 184 is provided. When the value of block 182 is greater than 0, the output of block 182 is inputted into to a multiplier 186. The multiplier 186 multiplies the y-axis value of the efficiency loss table 156 by the output of switch 184. The product of the multiplier 186 is sent to block 190. Block 190 adds the product from the multiplier 186 with the y-axis value from the constant friction lookup table 154, and sends the value to a saturation dynamic limiter 192. A blend block 194 (which corresponds to the graph illustrated in FIG. 5B) receives the limited assist torque 66 and determines an assist torque percentage. The assist torque percentage and the output value from the limiter 192 are sent to a multiplier 196, which determines the friction value 152.

Turning back to FIG. 2, the final command module 58 receives as input the magnitude 142, the position 80, and the nominal assist 62. Based on the inputs, the final command module 58 determines a final assist value and generates an assist command 200 based thereon. An exemplary assist determination method is illustrated at 140 of FIG. 6.

Referring to FIG. 6, the merged value of the hysteresis rise value 88 and the hysteresis rise value 98 from the limiter 126 and the friction value 152 are multiplied together at a multiplier 202. The assist determination method may include a slew rate limit block 204 to limit a maximum rate of change of the output of the multiplier 202. The output 206 of the slew rate limit block 204 and a gain factor 208 are both inputted into a first order low pass filter 210, which determines a hysteresis value 212. The hysteresis value 212 is converted into motor coordinates by block 214 and is sent to a limiter 216. The output of the limiter 216 is sent to block 218, which adds the nominal assist 62 to determine the assist command 200.

Figure 12:
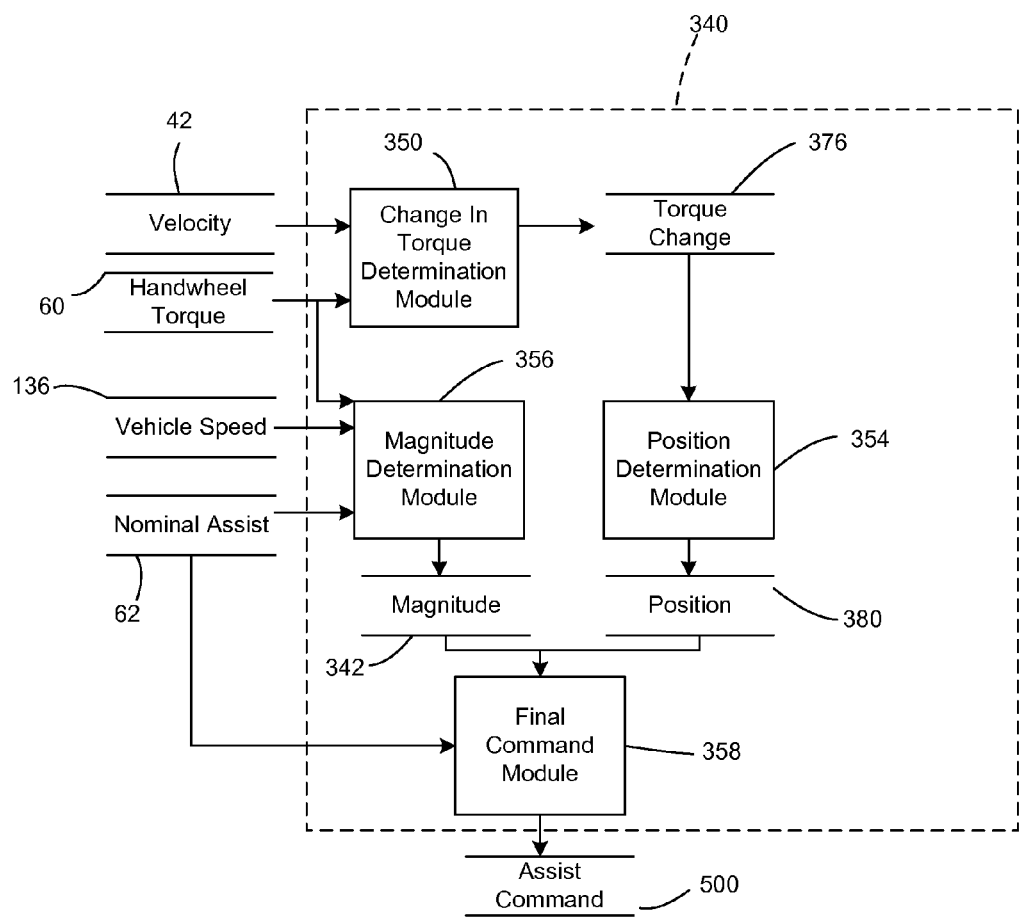
FIG. 12 is a dataflow diagram illustrating a steering control system in accordance with another embodiment of the steering control system shown in FIG. 1.

FIG. 12 is an alternative embodiment of a dataflow diagram illustrating an exemplary alternative embodiment of a control module 340 used to control the steering system 12 of FIG. 1. Generally speaking, the steering control systems and methods of the alternative embodiment as shown in FIGS. 12-15 compensate for the undesirable effects of friction, when a direction of the handwheel is reversed. In various embodiments, the systems and methods of the present disclosure provide additional assist when the driver is steering into an increasing effort and provide reduced assist when the driver is returning to center, or against a decreasing effort.

For example, the methods and systems can monitor a change in handwheel torque and/or velocity, and can follow a hysteresis loop to determine a percent of additional assist or reduction assist that should be applied. At low velocities, the methods and systems can determine the direction of the compensation based on handwheel torque. At high input velocities, the direction can be determined based on velocity. This allows the compensation to continue in the direction determined by the velocity, even though the input torque may drop. At intermediate input speeds, the methods and systems can blend between the two methods. To achieve this functionality, the velocity can be converted to an equivalent torque. Likewise, the equivalent torque may also be converted to the velocity. The magnitude of the additional assist can be determined by predetermined values based on the nominal assist, driver torque, and vehicle speed.

In one example, the control module 340 includes a change in torque determination module 350, a position determination module 354, a magnitude determination module 356, and a final command module 358.

The change in torque determination module 350 receives as input velocity 42 (motor velocity or handwheel velocity) and handwheel torque 60. Based on the inputs the change in torque determination module 350 determines a change in torque (e.g., a torque change 376). For example, the change in torque determination module 350 determines the change in torque based on a change in the handwheel torque 60 at low velocities (e.g., below a threshold). In another example, the change in torque determination module 350 determines the torque change 376 based on the velocity 42 (i.e., that is converted to torque) at high velocities (e.g., above a threshold). In yet another example, the change in torque determination module determines 350 the torque change 376 based on a blending method when the velocity 42 is between the thresholds. An exemplary change in torque determination method is illustrated at 400 of the model of FIG. 13, and further illustrated in the model of FIG. 14.

Figure 13:
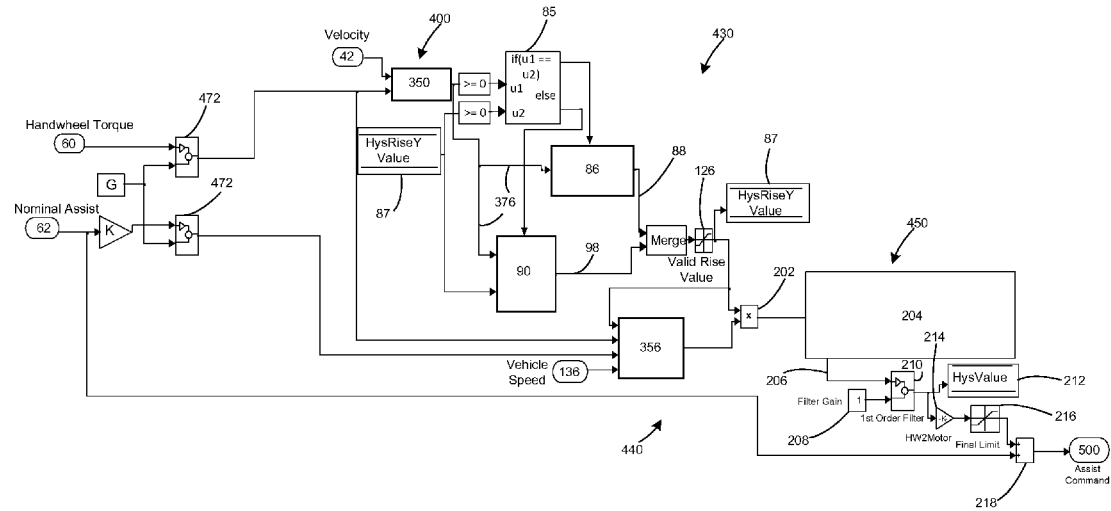
FIGS. 13-15 are models illustrating exemplary steering control methods and systems in accordance with the steering control system illustrated in FIGS. 1 and 12.
Figure 14:
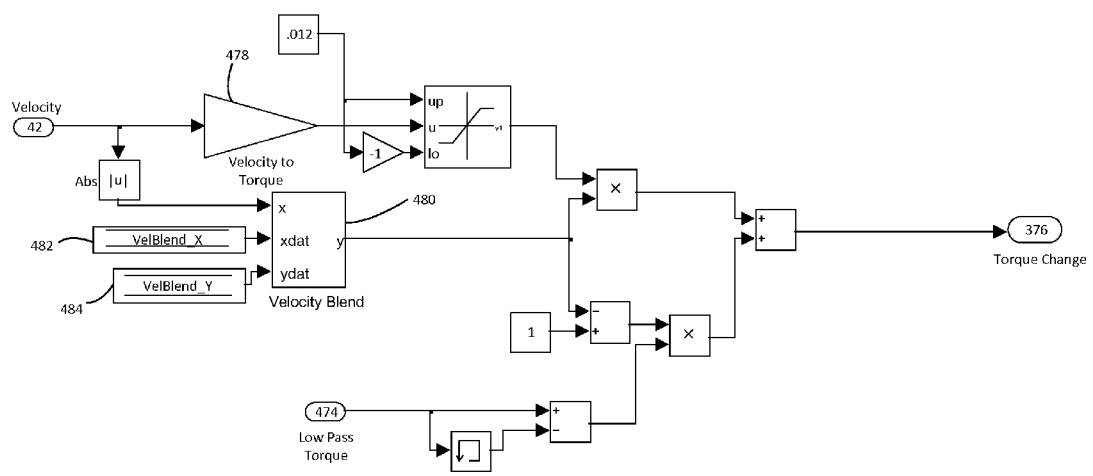

Referring to FIG. 13, the handwheel torque 60 is sent through a low pass filter 472 and to the torque determination module 350. Details of the torque determination module 350 are illustrated in FIG. 14. The torque determination module 350 determines the torque change 376, which is a delta in torque. The torque change 376 or delta torque becomes proportional to the handwheel velocity as the handwheel speed increases. The inputs into the torque determination module 350 are the velocity 42 and a low pass torque 474 from the low pass filter 472.

At relatively low handwheel speeds, the torque determination module 350 determines the torque change 376 based on the low pass torque 474 alone. However, at relatively high handwheel speeds, the torque determination module 350 determines the torque change 376 based on the velocity 42. At intermediate handwheel speeds, the torque determination module 350 determines the torque change 376 based on a combination of the low pass torque 474 and the velocity 42 combined or blended together. To achieve this, FIG. 14 illustrates a velocity to torque algorithm 478 that converts the velocity 42 into a torque value. In one illustrative example, the relatively low handwheel speeds may be below about 20 RPM in motor coordinates, the intermediate handwheel speeds may range from about 20 to about 50 RPM in motor coordinates, and the relatively high handwheel speeds may be above 50 RPM in motor coordinates.

The torque determination module 350 also includes a velocity blend lookup table 480. Blending values for the x-axis and the y-axis are provided, and are illustrated as 482 and 484 respectively. The velocity blend lookup table 480 provides the blending needed at relatively high, relatively low, and intermediate handwheel speeds to determine the torque change 376.

Turning back to FIG. 12, the position determination module 354 receives the torque change 376. Based on the inputs, the position determination module 354 determines the position 380 (e.g., an X, Y coordinate) on the hysteresis loop 82 (which is illustrated in FIG. 4). An exemplary position determination method using the quadrant system is illustrated at 430 of the model of FIG. 13, and further illustrated by the models discussed above in FIGS. 7 through 10.

Referring to FIGS. 12-13, the magnitude determination module 356 receives as input the low pass torque 60 from the low pass filter 472, the nominal assist 62 from the low pass filter 472, and the vehicle speed 136. Based on the inputs, the magnitude determination module 356 determines a magnitude 342. In various embodiments, the magnitude 342 can be a friction value that is determined as shown in FIG. 5A and blended as shown in FIG. 5B. An exemplary friction determination method is illustrated at 440 of FIG. 13, and further illustrated by the model in FIG. 15.

Figure 15:
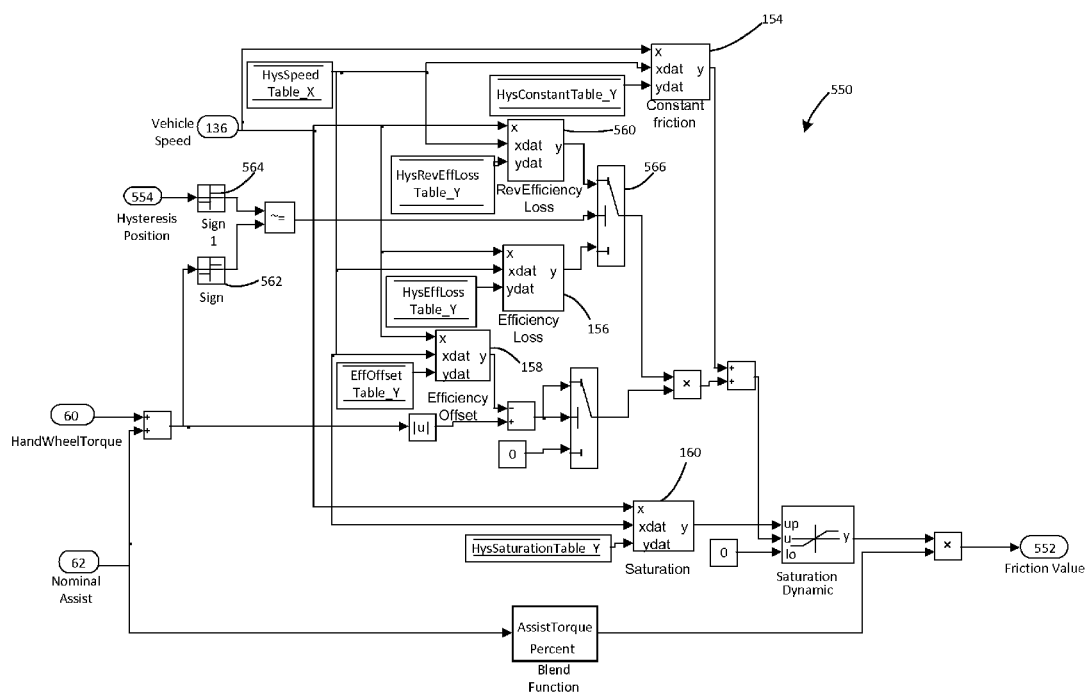

FIG. 15 is an exemplary illustration of one embodiment of a friction determination module 550 Similar to the embodiment as shown in FIG. 11, the vehicle speed 136, the low pass torque 60 from the low pass filter 472, and the nominal assist 62 from the low pass filter 472 (shown in FIG. 13) are inputs. Additionally, a merged value of the hysteresis rise value 88 and the hysteresis value 98 from the limiter 126, which is illustrated as the hysteresis position 554 is also sent to the friction determination module 550 as well. Similar to the embodiment as shown in FIG. 11, a friction value 552 is based on a constant friction lookup table 154 (which corresponds to the constant friction as illustrated in the graph of FIG. 5A), an efficiency loss table 156 (which corresponds to the efficiency loss as illustrated in FIG. 5A), an efficiency offset table 158 (which corresponds to the efficiency offset as illustrated in FIG. 5A), and a saturation table 160 (which corresponds to the saturation friction as illustrated in FIG. 5A). FIG. 15 also illustrates a reverse efficiency loss lookup table 560. As seen in FIG. 15, a sign 562 of the low pass torque 60 from the low pass filter 472 is compared against a sign 564 of the hysteresis position 554. If the signs 562 and 564 are the same, this indicates a forward efficiency, if the signs 562 and 564 are opposite, this indicates a reverse efficiency. If the signs 562 and 564 are not equal, then a switch 566 passes an upper value which represents reverse efficiency. Otherwise, the switch 566 passes a lower value, which is forward efficiency.

Turning back to FIG. 12, the final command module 358 receives as input the magnitude 342, the position 380, and the nominal assist 62. Based on the inputs, the final command module determines a final assist value and generates an assist command 500 based thereon. An exemplary assist determination method is illustrated at 450 of FIG. 13, and is similar to the exemplary assist determination method illustrated at 140 of FIG. 6.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system for a steering system, the control system comprising:
   a direction determination module for determining a change in a handwheel torque, the change in handwheel torque based on a previous torque value;
   a position determination module that determines a position on a hysteresis loop, the position on the hysteresis loop depending on the change in the handwheel torque, the position on the hysteresis loop based on a comparison between the change in the handwheel torque and a previous position the hysteresis loop; and
   a final command module that determines a final assist value based on the position, the final command module generating an assist command.

2. The control system as recited in claim 1, further comprising an input limiter module that receives as input the handwheel torque and limits the handwheel torque that is sent to the direction determination module.

3. The control system as recited in claim 2, wherein the input limiter receives a nominal assist and limits the nominal assist to a limited assist torque.

4. The control system as recited in claim 3, further comprising a magnitude determination module that receives the limited assist torque and the handwheel torque from the input limiter, and a vehicle speed.

5. The control system as recited in claim 4, wherein the magnitude determination module determines a magnitude of a hysteresis of the steering system.

6. The control system as recited in claim 5, wherein the final command module receives the magnitude and the nominal assist, and determines the final assist value based on the magnitude and the nominal assist.

7. The control system as recited in claim 2, comprising a direction determination module that receives the handwheel torque from the input limiter and calculates a change in the handwheel torque value.

8. The control system as recited in claim 7, wherein the position determination module includes a first quadrant block and a combined second and third quadrant block, wherein the first quadrant block is employed if a sign of the change in the handwheel torque is equal to a sign of the last hysteresis value.

9. The control system as recited in claim 8, wherein the combined second and third quadrant block multiplies the change in the handwheel torque by a hysteresis reversal gain to obtain a hysteresis change value.

10. The control system as recited in claim 9, wherein if the hysteresis change value is less than the last hysteresis value then a quadrant two block is employed and if the hysteresis change value is greater than the last hysteresis then a quadrant three block is employed.

11. A control system for a steering system, the control system comprising:
    a torque determination module that receives as input a velocity and a handwheel torque and determines a change in the handwheel torque, and one of the velocity, the handwheel torque, and a combination of the velocity and the handwheel torque are used to determine the change in the handwheel torque;
    a position determination module that determines a position on a hysteresis loop, the position on the hysteresis loop depending on the change in the handwheel torque, the position on the hysteresis loop based on a comparison between the change in the handwheel torque and a previous position on the hysteresis loop; and
    a final command module that determines a final assist value based on the position, the final command module generating an assist command.

12. The control system as recited in claim 11, wherein the change in handwheel torque is based on velocity if a handwheel velocity exceeds a first threshold value and is based on the handwheel torque if the handwheel velocity is less than a second threshold value.

13. The control system as recited in claim 11, wherein the change in handwheel torque is based on the combination of the velocity and the handwheel torque if a handwheel velocity is within an intermediate range.

14. The control system as recited in claim 11, further comprising a magnitude determination module that receives the handwheel torque, a nominal assist, and a vehicle speed.

15. The control system as recited in claim 14, wherein the magnitude determination module determines a magnitude of a hysteresis of the steering system.

16. The control system as recited in claim 15, wherein the final command module receives the magnitude and the nominal assist, and determines the final assist value based on the magnitude and the nominal assist.

17. The control system as recited in claim 11, wherein the position determination module includes a first quadrant block and a combined second and third quadrant block, wherein the first quadrant block is employed if a sign of the change in the handwheel torque is equal to a sign of a last hysteresis value.

18. The control system as recited in claim 17, wherein the combined second and third quadrant block multiplies the change in the handwheel torque by a hysteresis reversal gain to obtain a hysteresis change value.

19. The control system as recited in claim 18, wherein if the hysteresis change value is less than the last hysteresis value then a quadrant two block is employed and if the hysteresis change value is greater than the last hysteresis then a quadrant three block is employed.

* * * * *